US008250093B2

(12) United States Patent
Van der Linden

(10) Patent No.: US 8,250,093 B2
(45) Date of Patent: Aug. 21, 2012

(54) METHOD AND SYSTEM FOR UTILIZING A CACHE FOR PATH-LEVEL ACCESS CONTROL TO STRUCTURED DOCUMENTS STORED IN A DATABASE

(75) Inventor: Robbert C. Van der Linden, Scotts Valley, CA (US)

(73) Assignee: International Business Machines Corporation, Armonk, NY (US)

( * ) Notice: Subject to any disclaimer, the term of this patent is extended or adjusted under 35 U.S.C. 154(b) by 2560 days.

(21) Appl. No.: 10/648,499

(22) Filed: Aug. 25, 2003

(65) Prior Publication Data

US 2005/0050010 A1     Mar. 3, 2005

(51) Int. Cl.
    *G06F 17/30*      (2006.01)
(52) U.S. Cl. ...................................................... 707/781
(58) Field of Classification Search .................... 707/781
See application file for complete search history.

(56) References Cited

U.S. PATENT DOCUMENTS

| | | | |
|---|---|---|---|
| 4,907,151 A | 3/1990 | Bartlett | |
| 5,193,184 A * | 3/1993 | Belsan et al. | 707/200 |
| 5,283,830 A | 2/1994 | Hinsley et al. | |
| 5,412,807 A | 5/1995 | Moreland | |
| 5,561,786 A | 10/1996 | Morse | |
| 5,644,776 A | 7/1997 | DeRose et al. | |
| 5,652,858 A | 7/1997 | Okada et al. | |
| 5,671,403 A | 9/1997 | Shekita et al. | |
| 5,673,334 A | 9/1997 | Nichani et al. | |
| 5,758,361 A | 5/1998 | Van Hoff | |
| 5,787,449 A | 7/1998 | Vulpe et al. | |
| 5,878,415 A | 3/1999 | Olds | 707/9 |
| 5,893,086 A * | 4/1999 | Schmuck et al. | 707/1 |
| 5,920,861 A | 7/1999 | Hall et al. | 707/9 |
| 5,995,952 A | 11/1999 | Kato | |
| 6,044,373 A | 3/2000 | Gladney et al. | 707/10 |
| 6,081,810 A | 6/2000 | Rosenzweig et al. | |
| 6,085,193 A | 7/2000 | Malkin et al. | |
| 6,101,558 A * | 8/2000 | Utsunomiya et al. | 707/2 |
| 6,236,996 B1 | 5/2001 | Bapat et al. | |

(Continued)

FOREIGN PATENT DOCUMENTS

EP      0992873      4/2000

(Continued)

OTHER PUBLICATIONS

E. Damiani, S. De Capitani di Vimercati, S. Paraboschi, P. Samarati, "Design and implementation of an access control processor for XML documents". Computer Networks 33 (2000) pp. 59-75. Published Jun. 2000.*

(Continued)

*Primary Examiner* — Mark A Radtke
(74) *Attorney, Agent, or Firm* — Sawyer Law Group, P.C.

(57) ABSTRACT

An improved method and system for performing path-level access control evaluation for a structured document in a collection, where the structured document includes a plurality of nodes and each of the nodes is described by a path, is disclosed. The method comprises providing a cache for temporarily storing a cache entry for a path associated with a node of the plurality of nodes, receiving a query that includes a request to access the node, checking the cache entry for the path associated with the node, and determining whether to grant access to the node based on the cache entry.

31 Claims, 8 Drawing Sheets

U.S. PATENT DOCUMENTS

| | | | |
|---|---|---|---|
| 6,237,099 B1 | 5/2001 | Kurokawa | 713/200 |
| 6,249,844 B1* | 6/2001 | Schloss et al. | 711/122 |
| 6,308,173 B1 | 10/2001 | Glasser et al. | |
| 6,334,130 B1 | 12/2001 | Tada et al. | 707/9 |
| 6,336,114 B1 | 1/2002 | Garrison | 707/9 |
| 6,366,934 B1 | 4/2002 | Cheng et al. | |
| 6,381,602 B1 | 4/2002 | Shoroff et al. | 707/9 |
| 6,421,656 B1 | 7/2002 | Cheng et al. | |
| 6,438,576 B1 | 8/2002 | Huang et al. | |
| 6,457,103 B1* | 9/2002 | Challenger et al. | 711/133 |
| 6,480,865 B1 | 11/2002 | Lee et al. | |
| 6,487,566 B1 | 11/2002 | Sundaresan | |
| 6,502,101 B1 | 12/2002 | Verprauskus et al. | |
| 6,519,597 B1 | 2/2003 | Cheng et al. | |
| 6,584,458 B1 | 6/2003 | Millett et al. | |
| 6,631,371 B1 | 10/2003 | Lei et al. | |
| 6,658,652 B1 | 12/2003 | Alexander et al. | |
| 6,798,776 B1* | 9/2004 | Cheriton et al. | 370/392 |
| 6,820,082 B1 | 11/2004 | Cook et al. | |
| 6,836,778 B2 | 12/2004 | Manikutty et al. | |
| 6,853,992 B2 | 2/2005 | Igata | |
| 6,901,410 B2* | 5/2005 | Marron et al. | 707/104.1 |
| 6,922,695 B2* | 7/2005 | Skufca et al. | 707/10 |
| 6,938,204 B1 | 8/2005 | Hind et al. | |
| 6,947,945 B1 | 9/2005 | Carey et al. | |
| 6,959,416 B2 | 10/2005 | Manning et al. | |
| 7,016,915 B2 | 3/2006 | Shanmugasundaram et al. | |
| 7,031,962 B2 | 4/2006 | Moses | |
| 7,043,487 B2 | 5/2006 | Krishnamurthy et al. | |
| 7,353,222 B2 | 4/2008 | Dodds et al. | |
| 7,478,337 B2 | 1/2009 | Kodosky et al. | |
| 7,493,603 B2 | 2/2009 | Fuh et al. | |
| 7,756,857 B2 | 7/2010 | Wan | |
| 7,818,666 B2 | 10/2010 | Dorsett, Jr. et al. | |
| 2001/0018697 A1 | 8/2001 | Kunitake et al. | |
| 2002/0038319 A1 | 3/2002 | Yahagi | |
| 2002/0099715 A1 | 7/2002 | Jahnke et al. | |
| 2002/0103829 A1 | 8/2002 | Manning et al. | |
| 2002/0111965 A1 | 8/2002 | Kutter | |
| 2002/0112224 A1 | 8/2002 | Cox | |
| 2002/0123993 A1 | 9/2002 | Chau et al. | |
| 2002/0133484 A1 | 9/2002 | Chau et al. | |
| 2002/0156772 A1 | 10/2002 | Chau et al. | |
| 2002/0156811 A1 | 10/2002 | Krupa | |
| 2002/0169788 A1 | 11/2002 | Lee et al. | |
| 2003/0014397 A1 | 1/2003 | Chau et al. | |
| 2003/0028495 A1 | 2/2003 | Pallante | |
| 2003/0204515 A1 | 10/2003 | Shadmon et al. | |
| 2003/0208490 A1* | 11/2003 | Larrea et al. | 707/9 |
| 2004/0044959 A1 | 3/2004 | Shanmugasundaram et al. | |
| 2004/0128615 A1 | 7/2004 | Carmel et al. | |
| 2004/0193607 A1* | 9/2004 | Kudo et al. | 707/9 |
| 2004/0243553 A1 | 12/2004 | Bailey | |

FOREIGN PATENT DOCUMENTS

| | | |
|---|---|---|
| WO | WO 03/030031 | 4/2003 |

OTHER PUBLICATIONS

Chilimbi, Trishui M. et al., "Cache-Conscious Structure Layout," ACM 1999, pp. 1-12.

Park, Sangwon et al., "XML Query Processing Using Signature and DTD," E-Commerce and Web Technologies, Sep. 2-6, 2002, pp. 162-171.

Park, Sangwon et al., "A New Query Processing Technique for XML Based on Signature," IEEE Apr. 18-21, 2001, pp. 22-29.

Park, Sangwon et al., "SigDAQ: an Enhanced XML Query Optimization Technique," The Journal of Systems and Software, No. 61, No. 2, Mar. 15, 2002, pp. 91-103.

Roth, Amir, et al., "Dependence Based Prefetching for Linked Data Structures," ACM 1998, pp. 115-126.

Shuf, Yefim, et al., "Creating and Preserving Locality of Java Applications at Allocation and Garbage Collection Times," ACM 2002, pp. 13-25.

Yang, Siuxi et al., "Speeding Up the Memory Hierarchy in Flat COMA Multiprocessors," IEEE, Feb. 1-5, 1997, pp. 4-13.

E. Damiani, S. De Capitani Di Vimercati, S. Paraboschi, P. Samarati, "A Fine-Grained Access Control System for XML Documents". ACM Transactions on Information and System Security, vol. 5, No. 2, pp. 169-202. Published May 2002.

Masatoshi Yoshikawa et al., "Xrel: A Path-Based Approach to Storage and Retrieval of XML Documents Using Relation Databases," Japan, ACM 2001.

Lin Guo et al., "XRANK: Ranked Keyword Search over XML Documents," ACM, SIGMOND 2003, Jun. 9-12, 2003, San Diego, CA.

V. Christophides et al., "Querying Structured Documents with Hypertext Links using OODBMS," France, ACM 1998.

You-Chin Fuh et al., "Annotated Automation Encoding of XML Schema for High Performance Schema Validation,", filed Apr. 16, 2003, U.S. Appl. No. 10/418,658, pp. 1-61.

Carl-Christian Kanne et al., "Efficient Storage of XML Data," Universitat Mannheim, Germany, Jun. 16, 1999, pp. 1-20.

"Using an XML Query Language to Publish Relational Data as XML," Dossier—ARC919990247, pp. 1-37.

* cited by examiner

| ConditionID 502 | Condition Expression 504 |
|---|---|
| C1 | equal($Group, Admin) & xpath(/bib/book[@title= "security"]) |
| C2 | ... |

| Path 602 | Value Expression 604 |
|---|---|
| /bib | [$User='Murata' or $User='Seki' or $User='Tozawa'] |
| /bib/@ver | [$User='Murata'] |
| /bib/text() | [$User='Murata' or $User='Seki'] |
| /bib/book | [($User='Murata' or $User='Tozawa') and not($User='Hada')] |
| /bib/book/text() | [$User='Murata' and not($User='Hada')] |
| /bib/book/@year | [$User='Murata' and not($User='Hada')] |
| /bib/book/title | if !p then [ref(1, ../)] |
| /bib/book/title/text() | if !p then [ref(1, ../../)] |

| Path 802 | Cache entry 804 |
|---|---|
| /.../... (806) | G (806a) |
| /.../... (807) | D (807a) |
| /.../... (808) | U (808a) |
| /.../... (809) | DD (809a) |

METHOD AND SYSTEM FOR UTILIZING A CACHE FOR PATH-LEVEL ACCESS CONTROL TO STRUCTURED DOCUMENTS STORED IN A DATABASE

FIELD OF THE INVENTION

The present invention relates generally to computer implemented database systems and, more particularly, to a method and system for providing path-level access control to structured documents stored in a database system.

BACKGROUND OF THE INVENTION

Structured documents are documents which have nested structures. Documents written in Extensible Markup Language (XML) are structured documents. XML is quickly becoming the standard format for delivering information over the Internet because it allows the user to design a customized markup language for many classes of structure documents. For example, a business can easily model complex structures such as purchase orders in XML form and send them for further processing to its business partners. XML supports user-defined tabs for better description of nested document structures and associated semantics, and encourages the separation of document content from browser presentation.

As more and more businesses present and exchange data in XML documents, database management systems (DBMS) have been developed to store, query and retrieve these documents which are typically stored on direct access storage devices (DASD), such as magnetic or optical disk drives for semi-permanent. Some DBMSs, known as relational databases, store and query the documents utilizing relational techniques, while other DBMSs, known as native databases, store the documents in their native formats. XML documents are typically grouped into a collection of similar or related documents. Thus, for example, a group of purchase orders can form a collection.

Once a collection of documents is stored in the database, relational or native, it is potentially available to large numbers of users. Therefore, data security becomes a crucial concern. In particular, the DBMS must be able to control, i.e., deny or grant, access to the data by the user. In a conventional relational DBMS where the data is stored in rows and columns in tables, security is generally directed to the table level, i.e., access to a table is controlled. While this may be sufficient for relational data, it is inadequate for controlling access to a collection of XML documents because an XML document stored in the database contains information that is much more diverse than data stored in rows in tables.

Access control for XML documents is fine-grained, that is, access to each node in an XML document is controlled. The term "node" is used in the DOM-sense, which is a standard XML construct well known to those skilled in the art. In that construct, the XML document is represented by a plurality of nodes that form a hierarchical node tree. Each node of the XML document is identified by a path that defines a hierarchical relationship between the node and its parent node(s). Thus, fine-grained access control to the nodes of an XML document is referred to as path-level access control.

For example, if an administrator wanted to limit access to a "salary" node in all documents in a collection "all_employees," the administrator would generate the following statement:

Deny read access on "/employee/salary" in collection "all_employees" to group non-managers This statement would deny access to all salary nodes with path "/employee/salary" in all documents in collection "all_employees." This type of statement is referred to as an access control rule. A set of access control rules directed to a collection of documents is referred to as an access control policy.

While it is possible to perform path-level access control evaluation by utilizing access control rules, such evaluation is relatively expensive because the DBMS must evaluate each access control rule to determine whether a user should be granted or denied access to data in a node. This process becomes prohibitive when the number of access control rules in a policy increases. Nevertheless, the alternative, i.e., coarse-grained access control or table level access control, is unacceptable.

Accordingly, a need exists for an improved method and system for providing path-level access control for structured documents stored in a database. The method and system should be integrated (or capable of being integrated) with an existing database system in order to use the existing resources of the database system. The present invention addresses such a need.

SUMMARY OF THE INVENTION

The present invention is directed to an improved method and system for performing path-level access control evaluation for a structured document in a collection, where the structured document comprises a plurality of nodes and each of the nodes is described by a path. The method comprises providing a cache for temporarily storing a cache entry for a path associated with a node of the plurality of nodes, receiving a query that includes a request to access the node, checking the cache entry for the path associated with the node, and determining whether to grant access to the node based on the cache entry.

BRIEF DESCRIPTION OF THE DRAWINGS

FIG. 5 illustrates a condition table according to a preferred embodiment of the present invention.

FIG. 6 illustrates a path table according to a preferred embodiment of the present invention.

FIG. 8 is a block diagram illustrating the cache according to a preferred embodiment of the present invention.

DETAILED DESCRIPTION

Figure 1:
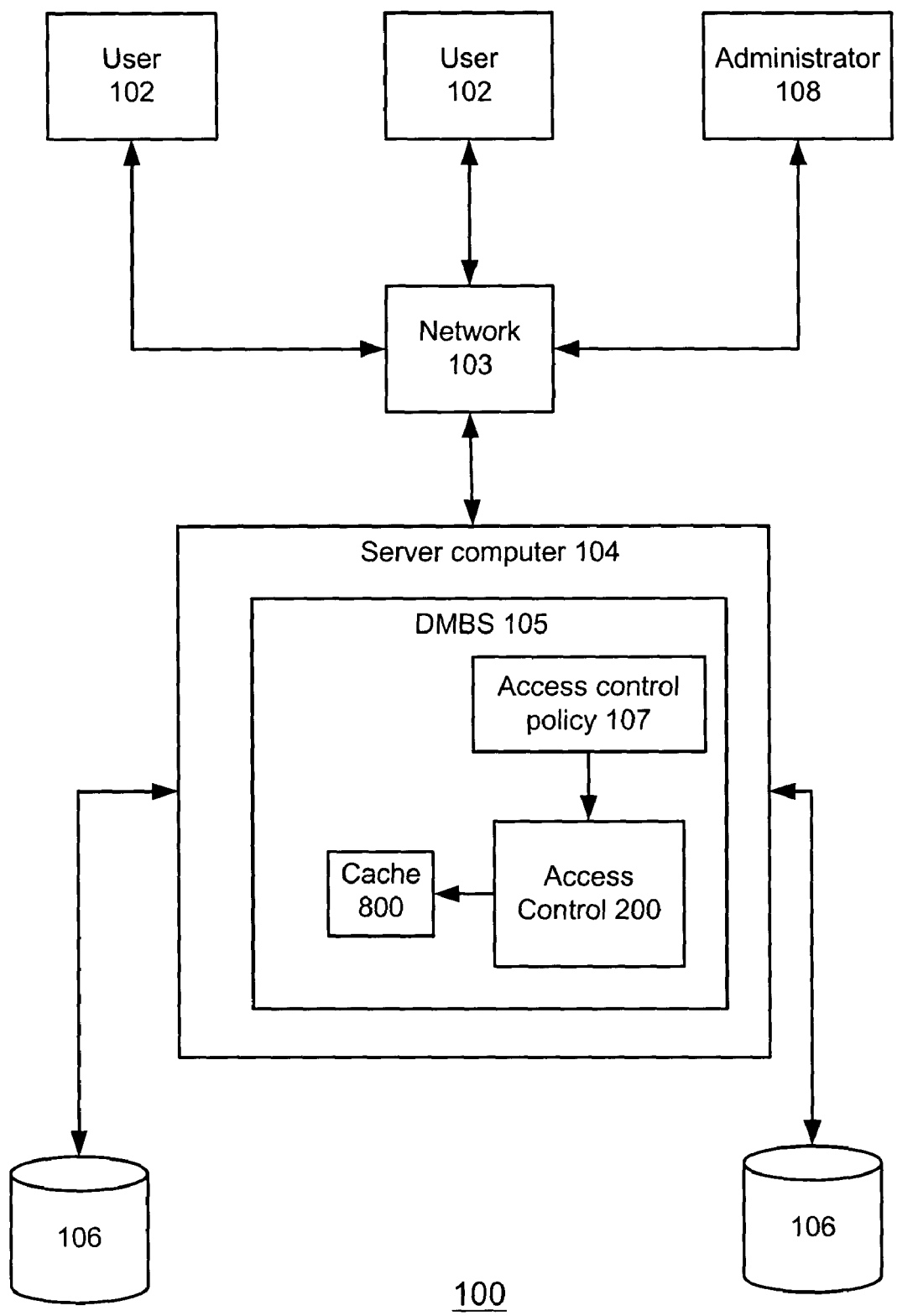
FIG. 1 is a block diagram of an exemplary computer environment for use with the present invention.

The present invention relates generally to computer implemented database systems and, more particularly, to an improved method and system for providing path-level access control for structured documents stored in a database. The following description is presented to enable one of ordinary skill in the art to make and use the invention and is provided in the context of a patent application and its requirements. Various modifications to the preferred embodiment and the generic principles and features described herein will be readily apparent to those skilled in the art. For example, the following discussion is presented in the context of a DB2® database environment available from IBM® Corporation. It should be understood that the present invention is not limited to DB2 and may be implemented with other database management systems. Thus, the present invention is to be accorded the widest scope consistent with the principles and features described herein.

According to a preferred embodiment of the present invention, a structured document is parsed into a plurality of nodes. Each node is then associated with a path that describes the node's hierarchical relationship to its parent node(s). An Access Control mechanism in the DBMS receives an access control policy, comprising at least one access control rule, for the structured document in the collection and generates for each of the paths associated with the nodes in the document a value expression. The value expression is an executable statement which describes the access control rule for that path, i.e., who is granted or denied access to data in that path. The value expression can be data-dependent if one of the at least one access control rules on which the value expression is based is data-dependent. If the value expression is not data-dependent, i.e., none of the at least one access control rules on which the value expression is based is data-dependent, then a result of an evaluation of the value expression is the same at all times for a given user, and the result can be stored in a cache.

During query execution when the user submits a request to access a node in the document, the DBMS evaluates a value expression for a path associated with the requested node, and if the value expression is not data-dependent, the result of the evaluation is stored in the cache. Thus, if the DBMS is required to check the path again during the session, e.g., the user submits a second query, the DBMS refers to the result in the cache instead of re-evaluating the value expression.

The preferred embodiment of the present invention presents several advantages over the conventional fine-grained access control process. The DBMS evaluates one value expression for a path instead of a plurality of access control rules making access control evaluation more efficient and faster. In addition, by storing the evaluation result of a non data-dependent value expression in cache, the number of evaluations the DBMS performs is minimized, further optimizing the access control evaluation process. Moreover, according to the preferred embodiment of the present invention, access control evaluation is performed during run time, as opposed to compile time, thereby allowing an administrator to change the access control policy at run time without having to recompile the query.

To describe further the present invention, please refer to FIG. 1, which is an exemplary computer environment for use with the present invention. In FIG. 1, a typical distributed computer system utilizes a network 103 to connect client computers 102 executing client applications to a server computer 104 executing software and other computer programs, and to connect the server computer 104 to data sources 106. These systems are coupled to one another by various networks, including LANs, WANs, and the Internet. Each client computer 102 and the server computer 104 additionally comprise an operating system and one or more computer programs (not shown).

The server computer 104 uses a data store interface (not shown) for connecting to the data sources 106. The data store interface may be connected to a database management system (DBMS) 105, which supports access to the data store 106. The DBMS 105 can be a relational database management system (RDBMS), such as the DB2® system developed by IBM Corporation, or it also can be a native XML database system. The interface and DBMS 105 may be located at the server computer 104 or may be located on one or more separate machines. The data sources 106 may be geographically distributed.

The DBMS 105 and the instructions derived therefrom are all comprised of instructions which, when read and executed by the server computer 104 cause the server computer 104 to perform the steps necessary to implement and/or use the present invention. While the preferred embodiment of the present invention is implemented in the DB2® product offered by IBM Corporation, those skilled in the art will recognize that the present invention has application to any DBMS, whether or not the DBMS 105 is relational or native. Moreover, those skilled in the art will recognize that the exemplary environment illustrated in FIG. 1 is not intended to limit the present invention, and that alternative environments may be used without departing from the scope of the present invention.

According to the preferred embodiment of the present invention, the DBMS 105 includes a cache 800 and access control policies 107 that are authored by an administrator 108 or some other authorized personnel. Each access control policy 107 describes the security rules pertaining to data stored in the database. The DBMS 105 also comprises an Access Control mechanism 200 that provides path-level access control to structured documents stored on disk. Storing data "on disk" refers to storing data persistently, for example, in the data store 106. While the Access Control mechanism 200 is shown as a subcomponent of the DBMS 105, those skilled in the art recognize that the Access Control mechanism 200 can also be a separate module coupled to the DBMS 105. Such a configuration would fall within the scope of the present invention.

Figure 2:
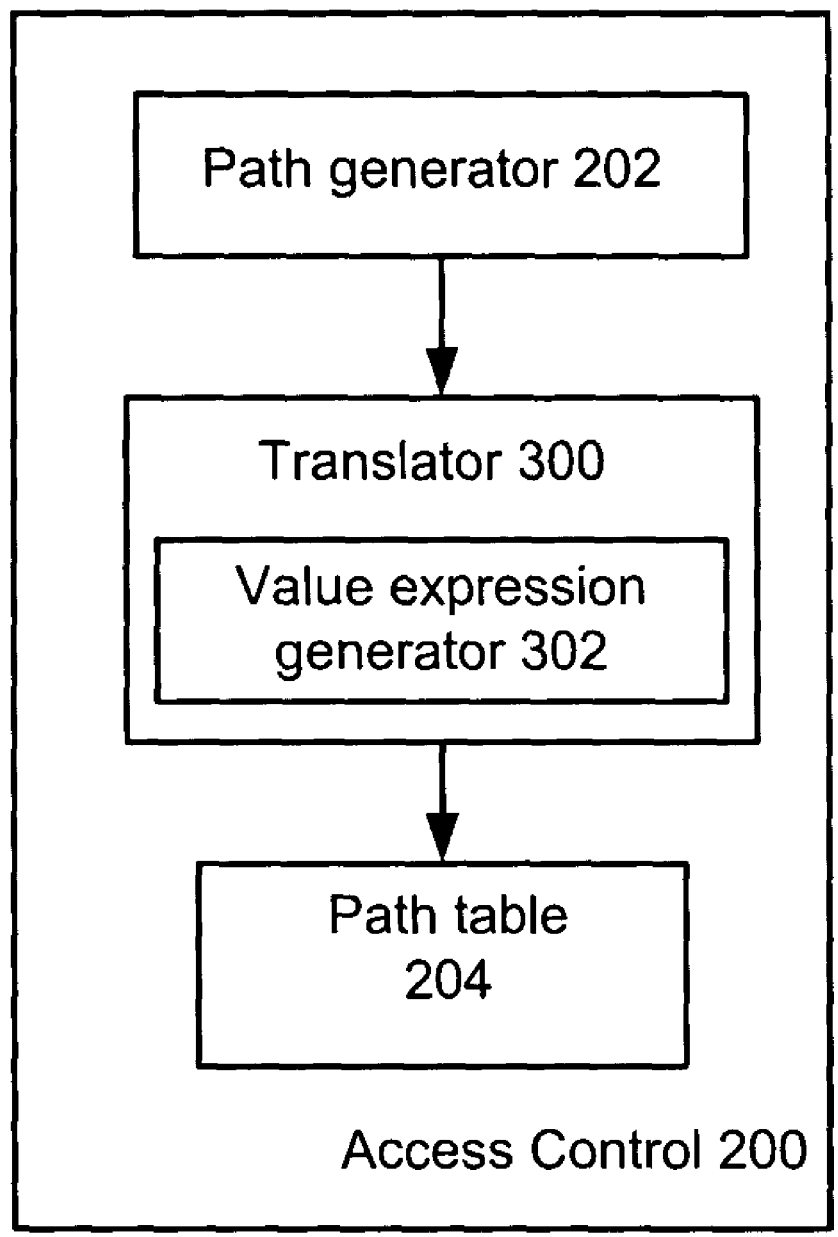
FIG. 2 is a block diagram of the Access Control mechanism according to the preferred embodiment of the present invention.

FIG. 2 is a block diagram of the Access Control mechanism 200 according to the preferred embodiment of the present invention. The Access Control mechanism 200 generates a path table that contains value expressions that are utilized by the DBMS 105 during access control evaluation. The Access Control mechanism 200 comprises a path table generator 202, a translator 300 and a path table 204. Each component will be described in further detail in conjunction with FIG. 3.

Figure 3:
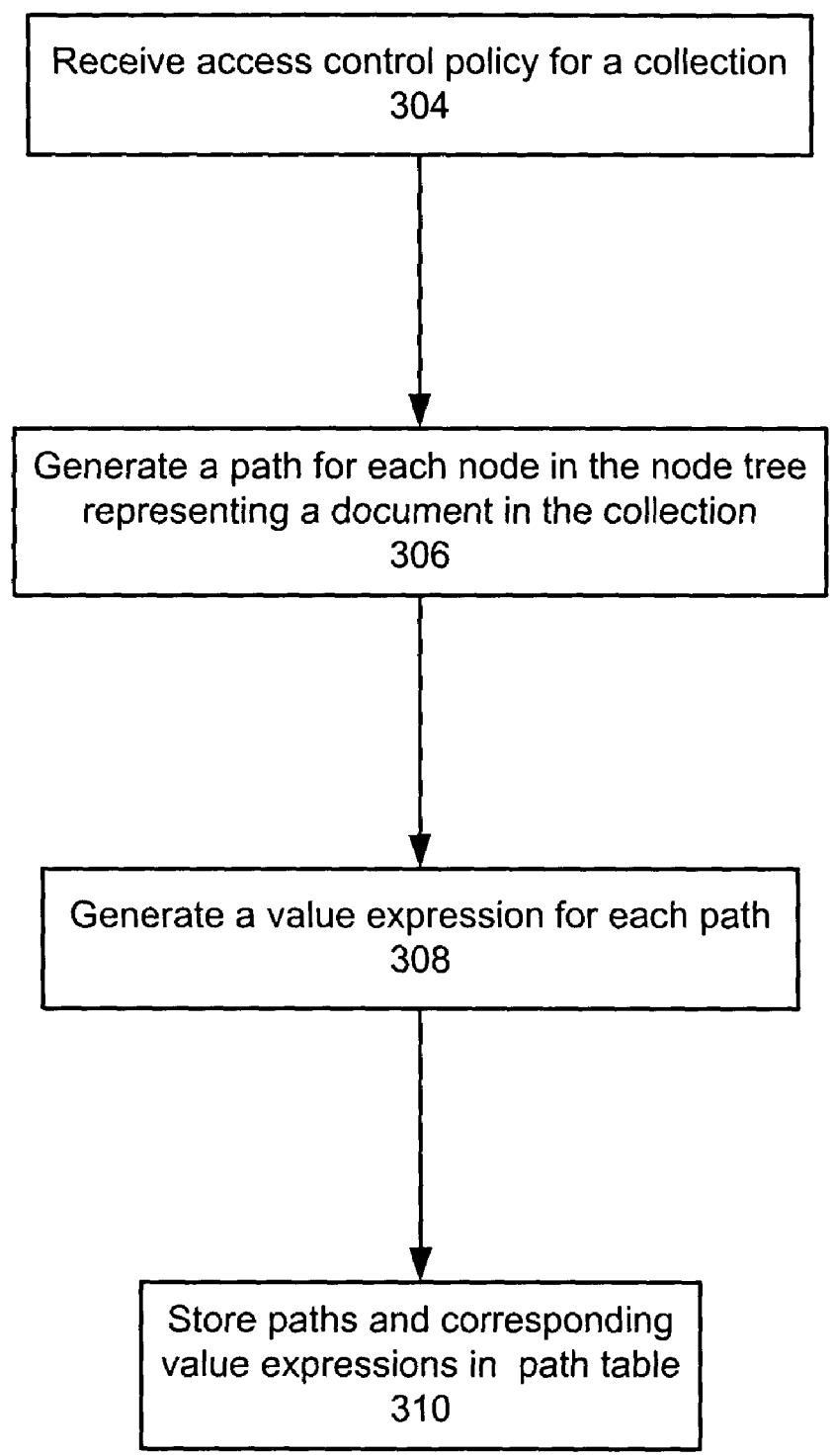
FIG. 3 is a flowchart illustrating a method for generating a path table according to a preferred embodiment of the present invention.

FIG. 3 is a flowchart illustrating a method for generating a path table according to a preferred embodiment of the present invention. In step 304, the Access Control mechanism 200 receives or retrieves an access control policy 107 pertaining to a collection of structured documents. In a preferred embodiment, the Access Control mechanism 200 receives the control policy 107 immediately after the administrator 108 has written and validated it. In another preferred embodiment, the control policy 107 can be stored in a repository in the DBMS 105, and retrieved by the Access Control mechanism 200 at a time after authorship. The access control policy 107 is presumably syntactically correct and logically valid when it is received by the Access Control mechanism 200. Alternatively, the Access Control mechanism 200 can be configured to evaluate the access control policy 107 and validate it.

The access control policy 107 for the collection comprises at least one access control rule. Each access control rule typically defines a subject to which the rule applies, an action and a path. The subject can be a user's name or a group of users. The action can be, but is not limited to, a read, an update, a create or a delete action. The path identifies the node to which the rule applies. For example, the following access control rule:

</bib/book/title,{Murata},+read> provides that the user Murata is allowed to read information at the title element node described by the path "/bib/book/title." This access control rule is data-independent because user Murata is allowed such access for all documents in the collection. The access control rule can also include predicates such that a user's access to a particular node is data-dependent. For example, an access control rule that reads:

Grant read access on "/employee/salary" in collection "IMB_employees" to Group Manager if "/employee/status=4"

is data-dependent because in order to evaluate whether the user has access to the element node "salary," the DBMS 105 must access the document itself, e.g., determine whether element node "status" is equal to four (4). The distinction between data-dependent and data-independent access control rules will become relevant in the discussion describing access control evaluation below.

Referring again to FIG. 3, once the access control policy 107 has been received by the Access Control mechanism 200, the path generator 202 generates a path for each node in a node tree representing a structured document in the collection in step 306. As stated above, it is well known to those skilled in the art that a structured document can be represented as a plurality of nodes forming a hierarchical node tree. Thus, for example, suppose a structured document, S1, is as follows:

```
<Questionnaire>
    <Name> Alice </Name>
    <Questions>
        <Q1> Yes </Q1>
        <Q2> No </Q2>
    </Questions>
<Questionnaire>
```

The node tree would comprise the following element nodes:

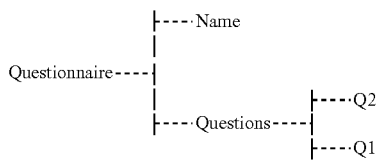

The path to element node Q1 is:

/Questionnaire/Questions/Q1

Referring again to FIG. 3, once the paths have been generated, the access control policy 107 and paths are passed to the translator 300, where in step 308, a value expression for each path is generated. In a preferred embodiment, the value expression for a path is an executable statement regarding who, if anyone, has access to the node associated with the path. The value expression represents a combination of all access control rules that affect the node.

Figure 4:
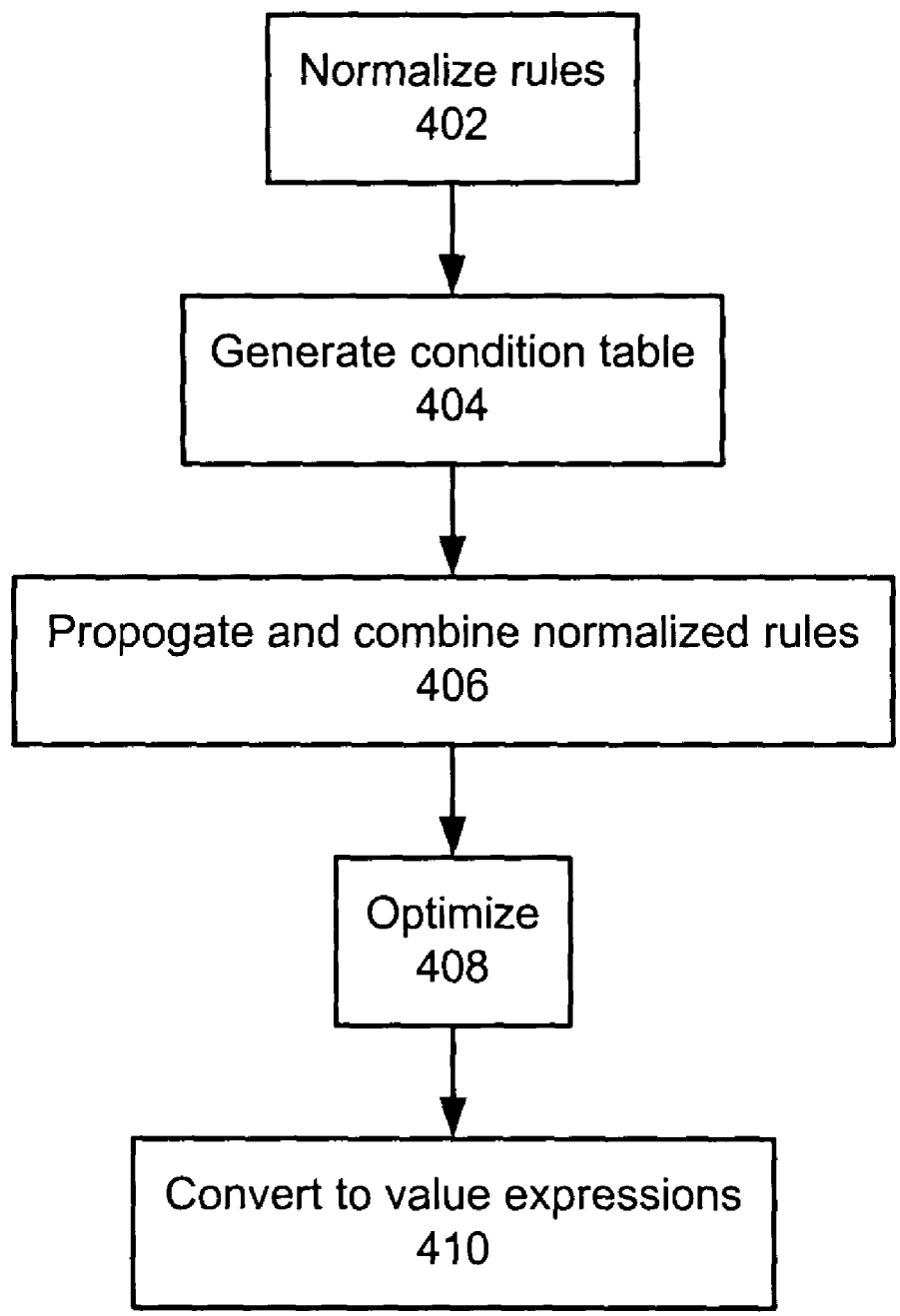
FIG. 4 is a flowchart illustrating a process for generating value expressions according to a preferred embodiment of the present invention.

FIG. 4 illustrates a process by which the translator 300 generates the value expressions. The process begins by normalizing each of the access control rules that make up the access control policy 107 in step 402. In a preferred embodiment, each access control rule is transformed into a normalized rule format that includes a head, a path expression, and a condition. The head indicates whether an action is granted or denied, the path expression describes the path associated with the node, and the condition indicates to whom the rule applies and under what circumstances. For example, the following access control rule:

</bib/book[@title="security"], GROUP Admin,+ read> is transformed into:

(grant_read, '/bib/book', equal($Group, Admin) & xpath(/bib/book[@title="security"])

The above format is called a normalized rule. After this step is finished, a set of normalized access control rules is generated.

Next, in step 404, the translator 300 generates and populates a condition table. FIG. 5 illustrates a condition table 500 according to a preferred embodiment of the present invention. The condition table 500 comprises a ConditionID column 502 and a Condition Expression column 504. The Condition Expression column 504 contains the third argument of each normalized rule, i.e., the condition, while the ConditionID column 502 contains an identifier associated with the condition. The translator 300 replaces the third argument of each normalized rule with the ConditionID corresponding to the condition to form a modified normalized rule.

Referring again to FIG. 4, after the condition table has been generated, the translator 300 propagates each modified normalized rule through each path generated by the path generator 202 (in step 306 of FIG. 3) in step 406. Propagation refers to how an access control rule associated with a particular node affects access to ancestor and descendant nodes. In general, propagation has two modes: up and down. Propagation-up refers to when an access control rule associated with a particular node propagates upward toward its ancestor nodes, while propagation-down refers to when an access control rule propagates downward toward its descendant nodes. Whether an access control rule propagates up or down depends on a set of propagation rules. The following table illustrates a set of propagation rules according a preferred embodiment of the present invention:

TABLE 1

| Action | Effect | Mode | Semantics |
|---|---|---|---|
| Read | Grant | Down | Rule specified to any node propagates down. |
|  |  | Up | Every GRANT for read-access propagates up to all ancestor elements (but not including the attributes and text nodes of these ancestor elements). |
|  | Deny | Down | Rule specified to any node propagates down. |
|  |  | Up | No propagation |
| Update | Grant | Down | Every GRANT for update-access propagates down to all the attributes and text nodes. |
|  |  | Up | No propagation |
|  | Deny | Down | No propagation |
|  |  | Up | No propagation |
| Create | Grant | Down | No propagation |
|  |  | Up | No propagation |
|  | Deny | Down | No propagation |
|  |  | Up | No propagation |
| Delete | Grant | Down | No propagation |
|  |  | Up | No propagation |
|  | Deny | Down | No propagation |
|  |  | Up | No propagation |

The propagation rules above are illustrative and not exclusive. Those skilled in the art recognize that different propagation rules can be implemented, and that the method and system of the present invention is not limited thereby.

In step 406, for each modified normalized rule, the translator 300 applies the propagation rules and identifies each path that is affected by the modified normalized rule. For example, if the modified normalized rule associated with a node is a "GRANT read" to user A, the modified normalized rule propagates up and down from the node. User A has "read" access to all descendant nodes and to all ancestor element nodes. Thus, the translator 300 identifies the paths associated with the descendant and ancestor element nodes as being accessible by user A. If more than one modified normalized rule affects a particular path, those rules are combined for the path in step 406.

Next, in step 408, the translator 300 optimizes the rules by minimizing repeated value expressions in the output. In a preferred embodiment, reference notations and supplemental value expressions are used to optimize the rules. For the reference notation, the translator 300 compares the ConditionID specified for a path associated with a node to the ConditionID of the path associated with its parent node. If the ConditionIDs are identical, then the ConditionID in the child node is replaced with "ref(1, . . . /)" indicating that the condition for the child node is identical to the condition of the parent node and therefore, there is no need to reevaluate the value expression for the child. In the case of a sibling reference, "ref(2, . . . /sibling-node)" is used to express the reference while ". . . /sibling-node" is the relative path.

A supplemental value expression is an additional value expression associated with a path that describes the access rule for any descendant path that exists or may exist in the future. For example, if user B has read access on path "a/b," then according to the propagation rules presented in Table 1, user B has read access to any descendant path associated with a node (descendant path/node) under "a/b." A descendant path/node may exist (i.e., a path and value expression has been generated for the descendent node) or it may not yet exist because, for example, a document containing this path has not yet been added to the collection and processed by the Access Control mechanism 200. In this case, the translator 300 generates a supplemental value expression for path "a/b" that indicates that user B has read access to any descendent path/node. Thus, if and when a new descendant path/node is introduced, there is no need to generate a value expression for the new path.

Those skilled in the art will readily appreciate that utilizing reference notations and supplemental value expressions are but two ways to optimize the rules. Other techniques can be utilized to further optimize the rules.

After optimization, a value expression generator 302 transforms each modified normalized access control rule into a value expression for the path, via step 410. In a preferred embodiment, the value expression generator 302 performs a syntactical conversion and an addition of a "!p" notation. For the syntactical conversion, each condition expression is transformed into syntax defined as XPath step qualifier. For example, a condition expression:

equal($Group, Admin) & xpath(/bib/book
      [@year=20001])

is transformed into:

[$Group='Admin' and @year=2000]for the path
      "/bib/book".

For the "!p" notation, the value expression generator 304 generates "!p" notation wherever the reference notation is specified. For example, if ref(1, . . . /) is specified at "/bib/book/title", then the value expression is extended to "if !p then [ref(1, . . . /)]". When compiled and executed, the "!p" notation indicates to the DBMS 105 that the value expression for that path is the same as that for the path of the parent node and therefore, the DBMS 105 does not need to reevaluate the value expression if access to the parent has already been granted. After step 410 is finished, a value expression is generated for each path.

The above described value expression generation process can further be described through the following simple example. Suppose the following XML document is representative of a collection:

```
<bib ver="1.0">
  <book year="1994">
    <title>TCP/IP Illustrated</title>
    <author>Alice</author>
  </book>
  <book year="2002">
    <title>Advanced Programming in the Java environment</title>
  </book>
</bib>
``` and the following rules make up the access control policy for the collection:

Rule 1: </bib, {Murata}, +read>
   Rule 2: </bib/@ver, {Seki}, +read>
   Rule 3: </bib/book, {Hada}, −read>
   Rule 4: </bib/book/title, {Tozawa}, +read>

Rule Normalization (step 402)

Here, rules 1-4 are transformed into normalized rules. Each normalized rule includes a head, a path expression and a condition. The normalized rules are as follows:

Rule 1: (grant_read, /bib, equal($User, Murata))
   Rule 2: (grant_read, /bib/@ver, equal($User, Seki))
   Rule 3: (deny_read, /bib/book, equal($User, Hada))
   Rule 4: (grant_read, /bib/book/title, equal($User, Tozawa))

Condition Table Generation (step 404)

Next, the translator 300 generates and populates the following condition table:

| ConditionID | Condition Expression |
|---|---|
| C1 | equal($User, Murata) |
| C2 | equal($User, Seki) |
| C3 | equal($User, Hada) |
| C4 | equal($User, Tozawa) |

The translator 300 then converts the normalized rules into the following modified normalized rules:

Rule 1: (grant_read, /bib, C1)
   Rule2: (grant_read, /bib/@ver, C2)
   Rule 3: (deny_read, /bib/book, C3)
   Rule 4: (grant_read, /bib/book/title, C4)

Rule Propagation and Combination (step 406):

Here, each rule is propagated through each path in the node tree (generated by the path generator 202 in step 306 of FIG. 3) according to the propagation rules in Table 1 above. The output of the propagation of the rule through a path is a statement indicating whether a user is granted or denied access to the path, and in turn, to the node. Thus, when each rule is propagated through each path making up the representative document, the resulting evaluation can be presented as follows:

```
Rule 1 (grant_read, /bib, C1)
        /bib                   : C1
        /bib/@ver              : C1
        /bib/text( )           : C1
        /bib/book              : C1
        /bib/book/text( )      : C1
        /bib/book/@year        : C1
        /bib/book/title        : C1
        /bib/book/title/text( ): C1
Rule 2 (grant_read, /bib/@ver, C2)
        /bib                   : C1, C2
        /bib/@ver              : C1, C2
        /bib/text( )           : C1
        /bib/book              : C1
        /bib/book/text( )      : C1
        /bib/book/@year        : C1
        /bib/book/title        : C1
        /bib/book/title/text( ): C1
Rule 3 (deny_read, /bib/book, C3)
        /bib                   : C1, C2
        /bib/@ver              : C1, C2
        /bib/text( )           : C1
        /bib/book              : C1, {C3}
        /bib/book/text( )      : C1, {C3}
        /bib/book/@year        : C1, {C3}
        /bib/book/title        : C1, {C3}
        /bib/book/title/text( ): C1, {C3}
Note: { } indicates that a condition inside the
parenthesis implies negative permission.
Rule 4 (grant_read, /bib/book/title, C4)
        /bib                   : C1, C2, C4
        /bib/@ver              : C1
        /bib/text( )           : C1, C2
        /bib/book              : C1, C4, {C3}
        /bib/book/text( )      : C1, {C3}
        /bib/book/@year        : C1, {C3}
        /bib/book/title        : C1, C4, {C3}
        /bib/book/title/text( ): C1, C4, {C3}
```

Optimization (step 408)

Here, reference notations are used to minimize repetitive outputs.

```
/bib                    : C1|C2|C4
/bib/@ver               : C1
/bib/text( )            : C1|C2
/bib/book               : (C1|C4)&!C3
/bib/book/text( )       : C1&!C3
/bib/book/@year         : C1&!C3
/bib/book/title         : ref(1, ../)
/bib/book/title/text( ) : ref(1, ../../)
```

Value Expression Generation (step 410)

Here, each output statement is transformed into a value expression based on the condition expression in the condition table. A value expression is created for each path.

```
/bib                    : [$User='Murata' or $User='Seki' or
                           $User='Tozawa']
/bib/@ver               : [$User='Murata']
/bib/text( )            : [$User='Murata' or $User='Seki']
/bib/book               : [($User='Murata' or $User='Tozawa')
                           and not($User='Hada')]
/bib/book/text( )       : [$User='Murata' and not($User='Hada')]
/bib/book/@year         : [$User='Murata' and not($User='Hada')]
/bib/book/title         : if !p then [ref(1, ../)]
/bib/book/title/text( ) : if !p then [ref(1, ../../)]
```

Referring again to FIG. 3, after the value expressions have been generated, the Access Control mechanism 200 stores the paths and corresponding value expressions in the path table 204 in step 310. FIG. 6 illustrates a path table 600 for the collection of documents and the access control policy according to the example described above. As is shown, the table 600 comprises a path column 602 and a value expression column 604. The path column 602 contains the path to each node in the structured document and the value expression column 604 contains the value expression. In a preferred embodiment of the present invention, the value expressions are compiled before they are stored in the path table 204. The result is a set of mini-plans that can be efficiently executed by the DBMS 105 at runtime to perform access control checking.

Figure 7A:
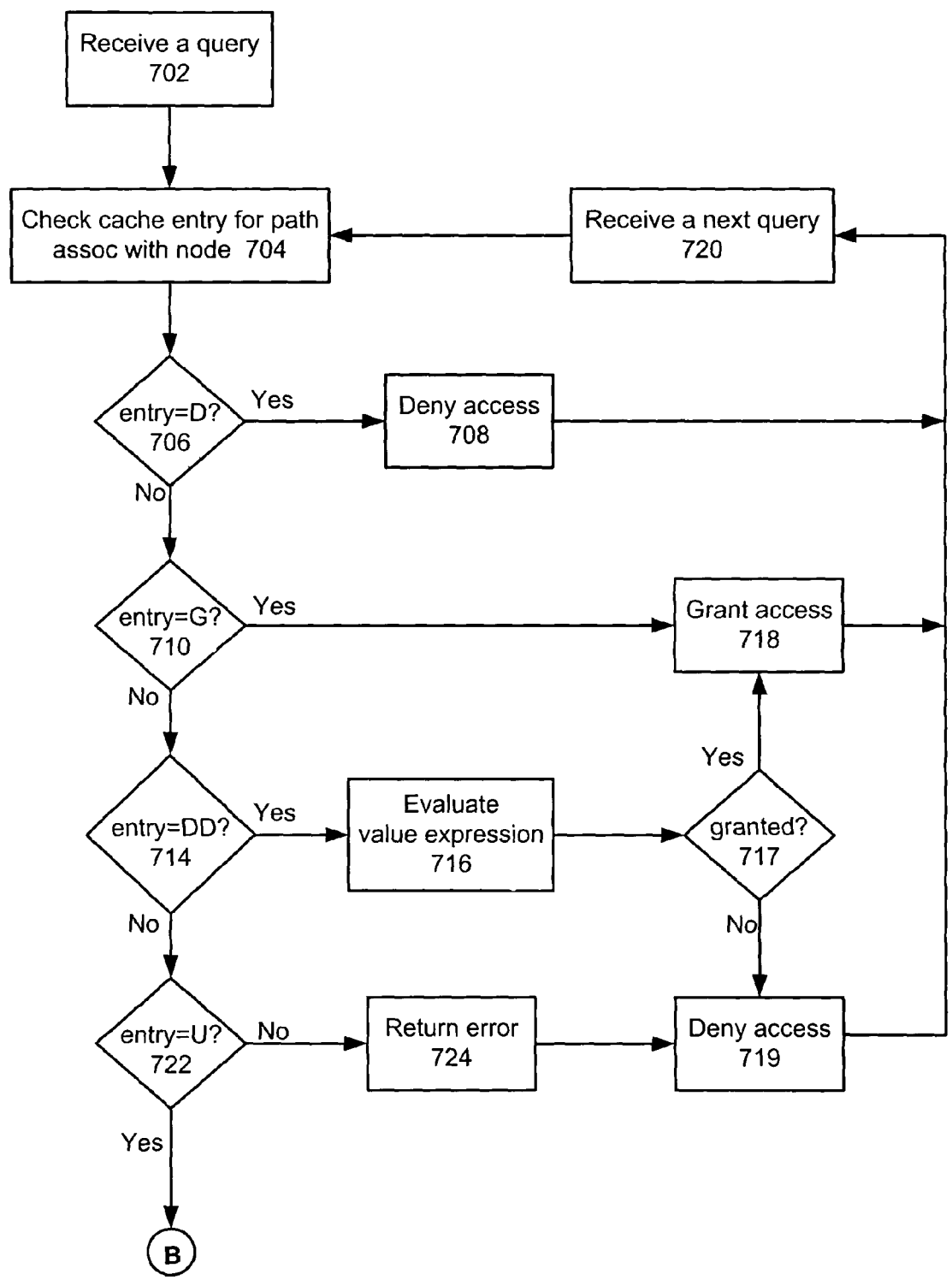
FIGS. 7A and 7B are flowcharts illustrating a process for utilizing a cache and value expressions according to a preferred embodiment of the present invention.
Figure 7B:
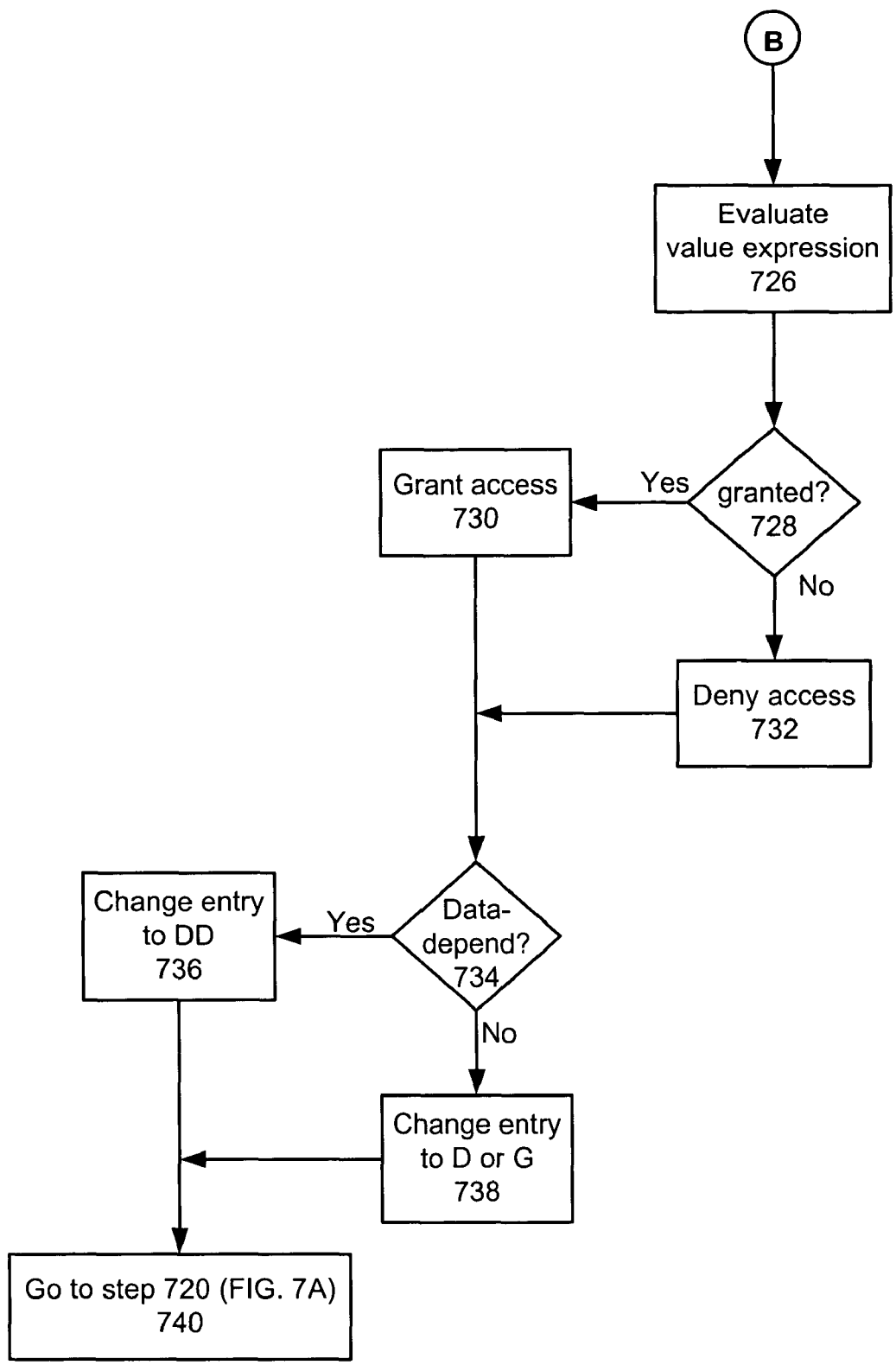

To describe further how the cache 800 and value expressions 604 are utilized by the DBMS 105 during access control evaluation at run time, please refer now to FIGS. 1, 2, 7A and 7B. FIGS. 7A and 7B are flowcharts illustrating a process 700 for utilizing a cache and value expressions according to a preferred embodiment of the present invention. The process begins in step 702 when a user requests access, e.g., read, to a node in a structured document in a collection. The request is typically in the form of a query that is written in Xquery or any other query language appropriate for querying structured documents. Typically, the DBMS 105 compiles the query during compile time and then executes the compiled query during run time. The DBMS 105 returns the structured document(s), or portions thereof, satisfying the query.

According to a preferred embodiment of the present invention, during the execution of the query (during run time), the DBMS 105 performs an access control check to determine whether the user is authorized to access the requested node. The DBMS 105 does this by checking the cache 800 in step 704. FIG. 8 is a block diagram illustrating the cache 800 according to a preferred embodiment of the present invention. As is shown, the cache 800 comprises one cache entry (806a, 807a, 808a, 809a) per path (806, 807, 808, 809). The cache entry is preferably one of four statements: granted (G), denied (D), unknown (U) and data-dependent (DD). In step 704, the DBMS 105 checks the cache entry, e.g., 806a, for the path, e.g., 806, associated with the node for which access is requested.

If the cache entry is a deny (D) statement (step 706), then the DBMS 105 denies access to the node in step 708. If the cache entry is a grant (G) statement (step 710), the DBMS 105 grants access to the node in step 718. If the cache entry is a data-dependent (DD) statement (step 714), the DBMS 105 accesses the path table 600 and evaluates the value expression 604 corresponding to the path 602 associated with the requested node, via step 716. If the result of the evaluation in step 716 is a grant, then the DBMS 105 grants access to the node in step 718, otherwise access is denied in step 719.

If the cache entry is an Unknown (U) statement (step 722) the DBMS 105 accesses the path table 600 and evaluates the value expression 604 corresponding to the path 602 associated with the requested node in step 726 via node B. Referring now to FIG. 7B, if the result of the evaluation in step 726 is a grant, then the DBMS 105 grants access to the node in step 730, otherwise access is denied in step 732. Next, the DBMS 105 determines whether the value expression 604 corresponding to the path 602 associated with the requested node is data-dependent in step 734. As stated above, a value expression 604 is data-dependent if one of the at least one access control rules on which the value expression 604 is based is data-dependent. If the value expression 604 is data-dependent, then the DBMS 105 changes the cache entry from an Unknown (U) statement to a data-dependent (DD) statement in step 736. Otherwise, the DBMS 105 changes the cache entry from an Unknown (U) statement to a deny (D) or grant (G) statement in step 738 depending on the result of the evaluation in step 726.

After the DBMS 105 grants or denies access to the node in steps 708, 718 and 719, or after the DBMS 105 changes the cache entry from an Unknown (U) statement to a data-dependent (DD) or deny (D) or grant (G) statement in steps 736 and 738, the DBMS 105 receives a next query from the user in step 720 (FIG. 7A) and repeats steps 704 to 738. In general, the cache entry for a path is an Unknown (U) statement if the DBMS 105 has not evaluated the value expression corresponding to the path. Accordingly, at the initiation of a query session for a user, each of the cache entries 804 in the cache 800 initially is an Unknown (U) statement. As the user submits additional queries and seeks access to more nodes, the cache entries 804 change from "U" to either "D", "G", or "DD." Eventually, the DBMS 105 is required to access the path table 600 only if the value expression 604 is data-dependent. Otherwise, the DBMS 105 utilizes the cache entry 804 to determine the user's access rights to a node.

While the process described above utilizes the cache 800 in cooperation with the value expressions 604, those skilled in the art recognize that the cache 800 can also be utilized with the underlying access control rules. Thus, rather than evaluating the value expression 604, the DBMS 105 can evaluate the access control policy affecting the path and the result of that evaluation is stored as a cache entry 804 in the cache 800.

An improved method and system for performing path-level access control evaluation for a structured document in a collection has been disclosed. The preferred embodiment of the present invention presents several advantages over the conventional fine-grained access control process. The DBMS 105 evaluates one value expression 604 for a path 602 instead of a plurality of access control rules making access control evaluation more efficient and faster. In addition, by temporarily storing the evaluation result of a data-independent value expression in cache 800, the number of evaluations the DBMS 105 performs is minimized, further optimizing the access control evaluation process. Moreover, according to the preferred embodiment of the present invention, access control evaluation is performed during run time, as opposed to compile time, thereby allowing an administrator to change the access control policy at run time without having to recompile the query. In addition, by performing access control evaluation during run time, the DBMS 105 is able to hide data in a document.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for performing path-level access control evaluation for a structured document, wherein the structured document comprises a plurality of nodes and each of the plurality of nodes is described by a path, the method comprising the steps of:
   (a) storing an access control statement in a cache entry for a path associated with a node of the plurality of nodes;
   (b) receiving a query, wherein the query comprises a request to access the node;
   (c) checking the cache entry for the path associated with the node; and
   (d) granting or denying access to the node based on the access control statement in the cache entry for the path associated with the node.

2. The method of claim 1, wherein the access control statement is one of a grant statement, a deny statement, an unknown statement, and a data-dependent statement.

3. The method of claim 2, wherein step (d) further comprises:
   (d1) granting access to the node responsive to the access control statement being a grant statement.

4. The method of claim 2, wherein step (d) further comprises:
   (d1) denying access to the node responsive to the access control statement being a deny statement.

5. The method of claim 2, wherein step (d) further comprises:
   (d1) evaluating an access control policy affecting the path in response to the access control statement being an unknown statement;
   (d2) granting access responsive to a result of the evaluation granting access; and
   (d3) denying access responsive to the result of the evaluation denying access.

6. The method of claim 5, further comprising:
   (e) determining whether the access control policy affecting the path is data-dependent;
   (f) changing the access control statement in the cache entry from the unknown statement to a grant statement or a deny statement based on the evaluation in response to the access control policy being data-independent; and
   (g) changing the access control statement in the cache entry from the unknown statement to a data-dependent statement if in response to the access control policy being data-dependent.

7. The method of claim 2, wherein step (d) further comprises:
   (d1) evaluating an access control policy affecting the path in response to the access control statement being a data-dependent statement;
   (d2) granting access responsive to a result of the evaluation granting access; and
   (d3) denying access responsive to the result of the evaluation denying access.

8. The method of claim 1, further comprising:
   (e) repeating steps (c) and (d) for a next node in the plurality of nodes.

9. The method of claim 5, wherein evaluating step (d1) further comprises:
   (d1i) evaluating a value expression for the path associated with the node, wherein the value expression is an executable statement based on the access control policy affecting the path and indicates who has access to the node.

10. The method of claim 1, wherein steps (c) and (d) are performed during run-time.

11. A computer readable medium containing a computer program for performing path-level access control evaluation for a structured document, wherein the structured document comprises a plurality of nodes and each of the plurality of nodes is described by a path, the computer program comprising programming instructions for:
   (a) storing an access control statement in a cache entry for a path associated with a node of the plurality of nodes;
   (b) receiving a query, wherein the query comprises a request to access the node;
   (c) checking the cache entry for the path associated with the node; and (d) granting or denying access to the node based on the access control statement in the cache entry for the path associated with the node.

12. The computer readable medium of claim 11, wherein the access control statement is one of a grant statement, a deny statement, an unknown statement, and a data-dependent statement.

13. The computer readable medium of claim 12, wherein instruction (d) further comprises:
(d1) granting access to the node responsive to the access control statement being a grant statement.

14. The computer readable medium of claim 12, wherein instruction (d) further comprises:
(d1) denying access to the node responsive to the access control statement being a deny statement.

15. The computer readable medium of claim 12, wherein instruction (d) further comprises:
(d1) evaluating an access control policy affecting the path in response to the access control statement being an unknown statement;
(d2) granting access responsive to a result of the evaluation granting access; and
(d3) denying access responsive to the result of the evaluation denying access.

16. The computer readable medium of claim 15, wherein the computer program further comprises programming instructions for:
(e) determining whether the access control policy affecting the path is data-dependent;
(f) changing the access control statement in the cache entry from the unknown statement to a grant statement or a deny statement based on the evaluation in response to the access control policy being data-independent; and
(g) changing the access control statement in the cache entry from the unknown statement to a data-dependent statement in response to the access control policy being data-dependent.

17. The computer readable medium of claim 12, wherein instruction (d) further comprises:
(d1) evaluating an access control policy affecting the path in response to the access control statement being a data-dependent statement;
(d2) granting access responsive to a result of the evaluation granting access; and
(d3) denying access if responsive to the result of the evaluation denying access.

18. The computer readable medium of claim 11, wherein the computer program further comprises programming instructions for:
(e) repeating instructions (c) and (d) for a next node in the plurality of nodes.

19. The computer readable medium of claim 15, wherein evaluating instruction (d1) further comprises:
(d1i) evaluating a value expression for the path associated with the node, wherein the value expression is an executable statement based on the access control policy affecting the path and indicates who has access to the node.

20. The computer readable medium of claim 11, wherein instructions (c) and (d) are performed during run-time.

21. A method for performing path-level access control evaluation for a structured document, wherein the structured document comprises a plurality of nodes and each of the plurality of nodes is described by a path, the method comprising the steps of:
(a) storing an access control statement in a cache entry for a path associated with a node of the plurality of nodes, wherein the access control statement is one of a grant statement, a deny statement, an unknown statement, and a data-dependent statement;
(b) receiving a query, wherein the query comprises a request to access the node;
(c) checking the cache entry for the path associated with the node;
(d) granting access to the node responsive to the access control statement being a grant statement;
(e) denying access to the node responsive to the access control statement being a deny statement; and
(f) evaluating a value expression for the path associated with the node to produce a result in response to the access control statement being an unknown statement or a data-dependent statement,
wherein the value expression is an executable statement based on an access control policy affecting the path and indicates who has access to the node.

22. The method of claim 21, further comprising:
(g) granting or denying access to the node based on the result of the evaluation;
(h) changing the access control statement in the cache entry from the unknown statement to a grant statement or a deny statement based on the result of the evaluation in response to the access control policy being data-independent; and
(i) changing the access control statement in the cache entry from the unknown statement to a data-dependent statement in responsive to the access control policy being data-dependent.

23. The method of claim 22, further comprising:
(j) repeating steps (c) through (i) for a next node in the plurality of nodes.

24. A computer readable medium containing a computer program for performing path-level access control evaluation for a structured document, wherein the structured document comprises a plurality of nodes and each of the plurality of nodes is described by a path, the computer program comprising programming instructions for:
(a) storing an access control statement in a cache entry for a path associated with a node of the plurality of nodes, wherein the access control statement is one of a grant statement, a deny statement, an unknown statement, and a data-dependent statement;
(b) receiving a query, wherein the query comprises a request to access the node;
(c) checking the cache entry for the path associated with the node;
(d) granting access to the node responsive to the access control statement being a grant statement;
(e) denying access to the node responsive to the access control statement being a deny statement; and
(f) evaluating a value expression for the path associated with the node to produce a result in response to the access control statement being an unknown statement or a data-dependent statement,
wherein the value expression is an executable statement based on an access control policy affecting the path and indicates who has access to the node.

25. The computer readable medium of claim 24, wherein the computer program further comprises programming instructions for:
(g) granting or denying access to the node based on the result of the evaluation;
(h) changing the access control statement in the cache entry from the unknown statement to a grant statement or a deny statement based on the result of the evaluation in response to the access control policy being data-independent; and (i) changing the access control statement in the cache entry from the unknown statement to a data-dependent statement in response to the access control policy being data-dependent.

26. The computer readable medium of claim 25, wherein the computer program further comprises programming instructions for:

(j) repeating instructions (c) through (i) for a next node in the plurality of nodes.

27. A system for performing path-level access control evaluation for a structured document, wherein the structured document comprises a plurality of nodes and each of the plurality of nodes is described by a path, the system comprising:

a database management system operable to receive a query, wherein the query comprises a request to access a node of the plurality of nodes; and a cache coupled to the database management system, the cache being operable to store an access control statement in a cache entry for a path associated with the node, wherein the database management system is further operable to check the cache entry for the path associated with the node and to grant or deny access to the node based on the access control statement in the cache entry for the path associated with the node.

28. The system of claim 27, wherein the access control statement is one of a grant statement, a deny statement, an unknown statement, and a data-dependent statement.

29. The system of claim 28, further comprising:

an access control mechanism coupled to the database management system, the access control mechanism being operable to determine access control to the node responsive to the access control statement being an unknown statement or a data-dependent statement.

30. The system of claim 29, wherein the access control mechanism is further operable to generate a value expression for the path associated with the node based on an access control policy affecting the path, and wherein the database management system is further operable to evaluate the value expression for the path to determine whether to grant or deny access to the node.

31. The system of claim 30, wherein the database management system is further operable to change the access control statement in the cache entry from the unknown statement to a grant statement or a deny statement based on a result of the evaluation of the value expression if responsive to the value expression for the path being data-independent and to change the access control statement in the cache entry from the unknown statement to a data-dependent statement responsive to the value expression for the path being data-dependent.

* * * * *